(12) United States Patent
Kuhn

(10) Patent No.: US 7,281,619 B2
(45) Date of Patent: Oct. 16, 2007

(54) MULTIPLE-DISK BRAKE OR CLUTCH

(75) Inventor: Harald Kuhn, Frammersbach (DE)

(73) Assignee: Linde Material Handling GmbH, Aschaffenburg (DE)

( * ) Notice: Subject to any disclaimer, the term of this patent is extended or adjusted under 35 U.S.C. 154(b) by 236 days.

(21) Appl. No.: 11/116,141

(22) Filed: Apr. 27, 2005

(65) Prior Publication Data

US 2005/0247537 A1    Nov. 10, 2005

(30) Foreign Application Priority Data

Apr. 29, 2004   (DE) .................. 10 2004 021 067

(51) Int. Cl.
*F16D 65/853* (2006.01)

(52) U.S. Cl. .............. 192/70.12; 192/113.35; 188/71.6; 188/264 E; 188/264 P

(58) Field of Classification Search .............. 188/71.6, 188/264 D, 264 E, 264 CC, 264 P
See application file for complete search history.

(56) References Cited

U.S. PATENT DOCUMENTS

| | | | | |
|---|---|---|---|---|
| 3,039,567 A * | 6/1962 | Fisher | ..................... | 188/264 E |
| 3,812,928 A * | 5/1974 | Rockwell et al. | .......... | 180/65.5 |
| 4,431,091 A * | 2/1984 | Scibbe | ................... | 188/264 F |
| 5,197,574 A * | 3/1993 | Al-Deen et al. | ........... | 188/71.6 |
| 6,260,668 B1 * | 7/2001 | McClanahan | ............... | 188/71.5 |
| 6,651,762 B1 * | 11/2003 | Hokanson et al. | ......... | 180/65.5 |
| 7,036,640 B2 * | 5/2006 | Spielman | ................ | 188/264 P |

FOREIGN PATENT DOCUMENTS

JP          62-221918 A  *  9/1987

* cited by examiner

*Primary Examiner*—Richard M Lorence
(74) *Attorney, Agent, or Firm*—The Webb Law Firm

(57) ABSTRACT

A multiple-disk brake or clutch (1) includes at least one disk (2, 4) in a housing and at least one disk located on a shaft. Coolant is located in the housing (3). A coolant outlet (10) and a coolant inlet (7) of a cooling circuit (9) are located on the housing (3), whereby coolant can be delivered to the coolant outlet (10) by means of the disks (2, 4).

10 Claims, 4 Drawing Sheets

MULTIPLE-DISK BRAKE OR CLUTCH

CROSS-REFERENCE TO RELATED APPLICATION

This application claims priority to German Application No. 10 2004 021 067.5 filed Apr. 29, 2004, which is herein incorporated by reference in its entirety.

BACKGROUND OF T HE INVENTION

1. Field of the Invention

This invention relates to a multiple-disk device, e.g., a multiple-disk brake or clutch, with at least one disk located in a housing and at least one disk located on a shaft, in which coolant is in the housing.

2. Technical Considerations

Wet running multiple-disk brakes or clutches are used as parking brakes and/or service brakes in drive axles, for example in mobile machinery in the form of industrial trucks, or as clutches in transmissions of mobile machinery. The closed housing that contains the multiple-disk brake or clutch is filled with a determined quantity of coolant, such as hydraulic fluid, which is heated during operation by the energy dissipated during idling and towing when the brake or clutch is disengaged, and/or by the heat of friction given off when the multiple-disk brake or clutch is engaged, as well as by the energy dissipated from the adjacent components, e.g., from a transmission or a drive motor of the drive axle. As the amount of coolant in the housing increases, the amount of energy dissipated by the multiple-disk brake or clutch also increases, which results in reduced efficiency of the machinery that is equipped with a multiple-disk brake or clutch of this type. As the quantity of coolant decreases, of course, less energy is dissipated by the multiple-disk brake or clutch. However, during normal operation, the coolant may be unable to absorb enough heat, as a result of which temperature problems can occur inside the multiple-disk brake or clutch. These conditions can also result in the premature aging of the coolant.

An object of this invention is to provide a multiple-disk brake or clutch of the general type described above but which offers improved cooling and requires less construction effort.

SUMMARY OF THE INVENTION

In one embodiment, the invention teaches that a coolant outlet and a coolant inlet of a cooling circuit are provided on the housing. Coolant can be delivered to the coolant outlet by means of the disks.

The invention is based on the knowledge that in a multiple-disk brake or clutch, the coolant is pumped by the rotating disks from the smaller to the larger diameter. The invention teaches that this pumping action of the multiple-disk brake or clutch can be used to deliver the coolant to the coolant outlet on the housing and can thus be used to circulate the coolant in the cooling circuit. By means of the cooling circuit, an improved heat dissipation and, therefore, improved cooling can be achieved. As a result of the conveying action of the multiple-disk brake or clutch, no separate pump is required for the circulation of the coolant. The result is an improved cooling of the multiple-disk brake or clutch with a small amount of construction effort and expense. Premature aging of the coolant is also effectively prevented.

It is particularly advantageous if, in accordance with one aspect of the invention, the housing is only partly filled with coolant. As a result of the improved cooling of the coolant by the cooling circuit, the amount of coolant in the housing can be reduced, which results in reduced energy loss by the multiple-disk brake or clutch.

In one configuration of the invention, the shaft is oriented essentially horizontally. The coolant inlet is provided in the vicinity of the lowest point of the housing and/or the coolant outlet on the housing is provided in the area above the coolant level.

It is particularly advantageous if a collecting device is provided in the housing and is in communication with the coolant outlet. The coolant delivered to the coolant outlet by the multiple-disk brake or clutch is thus collected in the collection device, for example a pan-shaped catch basin, and from there it can flow into the coolant circuit.

For this purpose, the collecting device can be advantageously located in the housing underneath the coolant outlet.

It is particularly advantageous if the cooling circuit is provided with a cooling device, such as a radiator. A cooling device can achieve an improved dissipation of heat from the cooling circuit, as a result of which an improved cooling of the multiple-disk brake or clutch can be achieved with a reduced quantity of coolant.

If the cooling device is provided with a fan device, the thermal dissipation can be increased further.

The fan device can thereby be in continuous operation. The energy required to operate the fan device can be reduced if a blower device is temperature controlled, in particular as a function of the temperature of the coolant inside the housing.

It is particularly advantageous if, in accordance with a development of the invention, the multiple-disk brake or clutch can be placed in communication with a coolant unit. The coolant unit can achieve an additional delivery of coolant to the multiple-disk brake or clutch, and thus an improved dissipation of heat and cooling by flushing the housing.

The coolant unit can advantageously be turned on and off, as a result of which the operation of the coolant unit can easily be limited to operating conditions in which additional dissipation of heat is necessary.

In one configuration of the invention, the coolant unit can be turned on and off as a function of a brake signal. When the multiple-disk brake taught by the invention is used as a service brake, an additional cooling action can easily be achieved when the brake is in operation by turning on the coolant unit.

The outlet for the coolant that is delivered by the coolant unit can be advantageously provided in the housing, e.g., in the radially inner area of the multiple-disk brake. Consequently, it can easily be arranged that the coolant delivered from the coolant unit in the radially inner area strikes the disks on their end surfaces and is thereby distributed radially by the rotation of the disks. As a result of which, a small amount of coolant liquid can be used to ensure cooling of the multiple-disk brake in braking operation.

In one advantageous development of the invention, a transmission is located in the housing. A transmission that is located in a housing with the multiple-disk brake or clutch and is cooled by the coolant can be cooled by the circulation taught by the invention of the coolant in the coolant circuit by the multiple-disk brake or clutch without additional construction measures.

It is particularly advantageous if, in accordance with one configuration of the invention, the housing is in the form of an axle housing of a drive axle in which there is at least one drive motor, such as an electric motor or a hydraulic motor. A drive axle in which the drive motor is located next to the multiple-disk brake or clutch, and in which the heat generated is dissipated by means of the housing, can be cooled by the circulation of the coolant in the cooling circuit taught by the invention without any additional construction effort.

The use of a multiple-disk brake or clutch is particularly advantageous in a battery-powered electric industrial truck, in particular in a drive axle of the industrial truck, in which, next to the multiple-disk brake or clutch, there is at least one electric motor and/or a transmission. In a battery-powered electric industrial truck, the amount of heat dissipated must be kept as low as possible on account of the limited storage capacity of the battery.

BRIEF DESCRIPTION OF THE DRAWINGS

Additional advantages and details of the invention are explained in greater detail below with reference to the exemplary embodiments illustrated in the accompanying schematic figures, in which like reference numbers identify like parts throughout.

DESCRIPTION OF THE PREFERRED EMBODIMENTS

Figure 1:
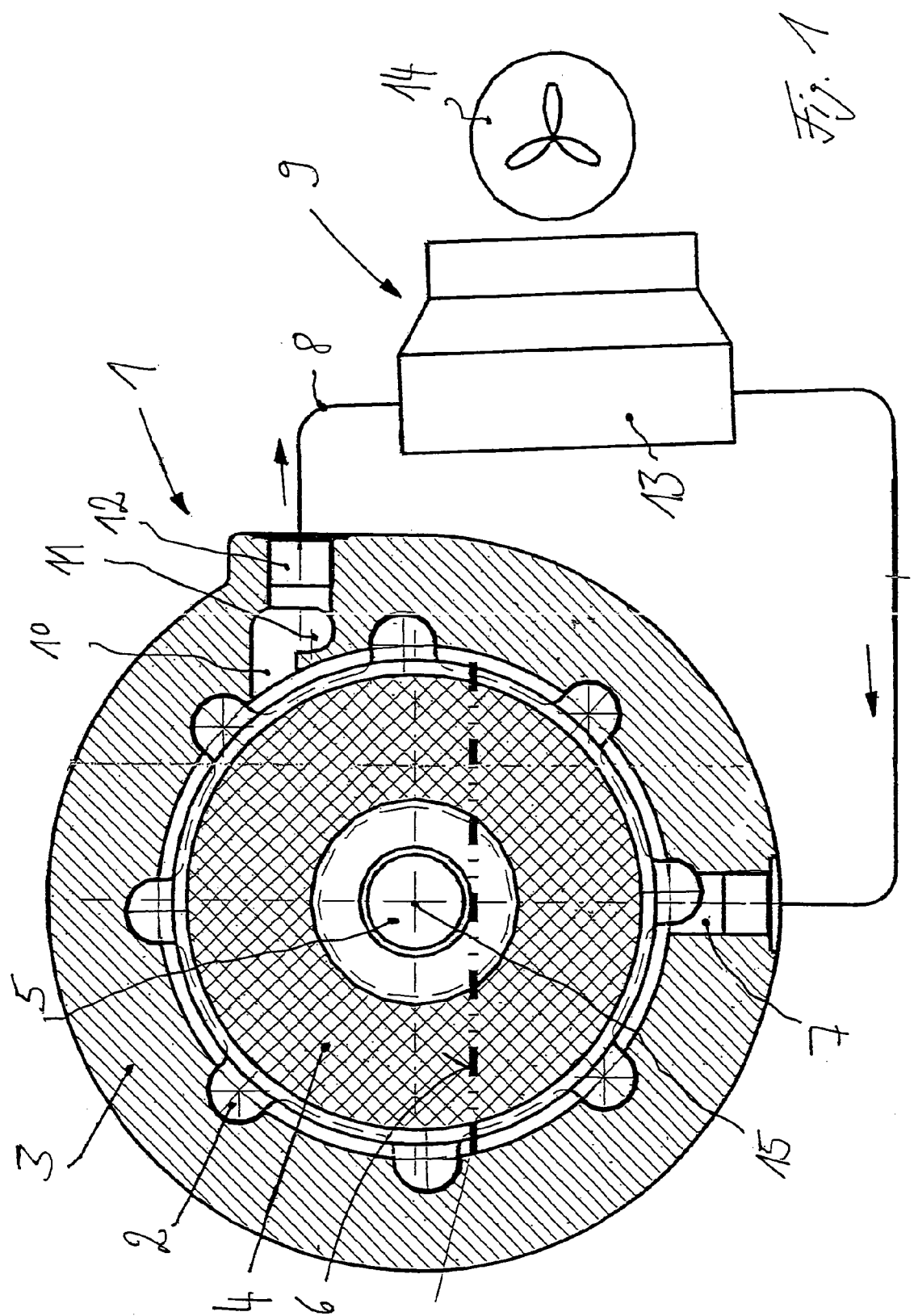
FIG. 1 is a cross section of a multiple-disk brake as taught by the invention.

FIG. 1 shows a multiple-disk brake 1 as taught by the invention in cross section. FIG. 1 shows one of a plurality of disks 2 of the multiple-disk brake 1, which is non-rotationally mounted in a housing 3, for example in an axle housing of a drive axle of an industrial truck. For this purpose, the disk 2 has a plurality of radially expanded areas that are distributed over the periphery and are in effective communication with corresponding recesses, such as grooves, in the housing 3. Between the disks 2, which are fastened non-rotationally to the housing 3, are disks 4 that are provided with a friction lining, which are coupled so that they rotate synchronously with a shaft 5 and one disk 4 of which is shown in FIG. 1. In the illustrated exemplary embodiment, the housing 3 stands still and the shaft 5 is mounted so that it can rotate around an essentially horizontal axis. The disks 2 can be in the form of steel disks, while the disks 4 form friction disks which are provided with a friction lining on both sides.

In the closed housing 3 that surrounds the multiple-disk brake 1, there is coolant, which can be hydraulic fluid, for example. In one embodiment, the housing 3 is partly filled, whereby when the multiple-disk brake 1 is stopped, a coolant level surface 6 is as shown in FIG. 1. The coolant level surface 6 is below the shaft 5 when the brake 1 is not moving.

On the housing 3, in the vicinity of the lowest point, there is a coolant inlet 7 of a cooling circuit 9. The coolant inlet 7 can be in the form of a housing boring to which a line 8 of the cooling circuit 9 is connected. In the area above the coolant level surface 6, a coolant outlet 10 is provided on the housing 3. The coolant outlet 10 can be in the form of a boring-shaped opening or in the form of a groove-shaped opening that extends in the axial direction. Also provided in the housing 3 is a collecting device 11, for example a pan-shaped collecting basin, which is connected with the coolant outlet 10 and is located underneath the coolant outlet 10. The collecting device 11 is also in connection with a housing boring 12 to which the line 8 of the cooling circuit 9 is connected.

Figure 2:
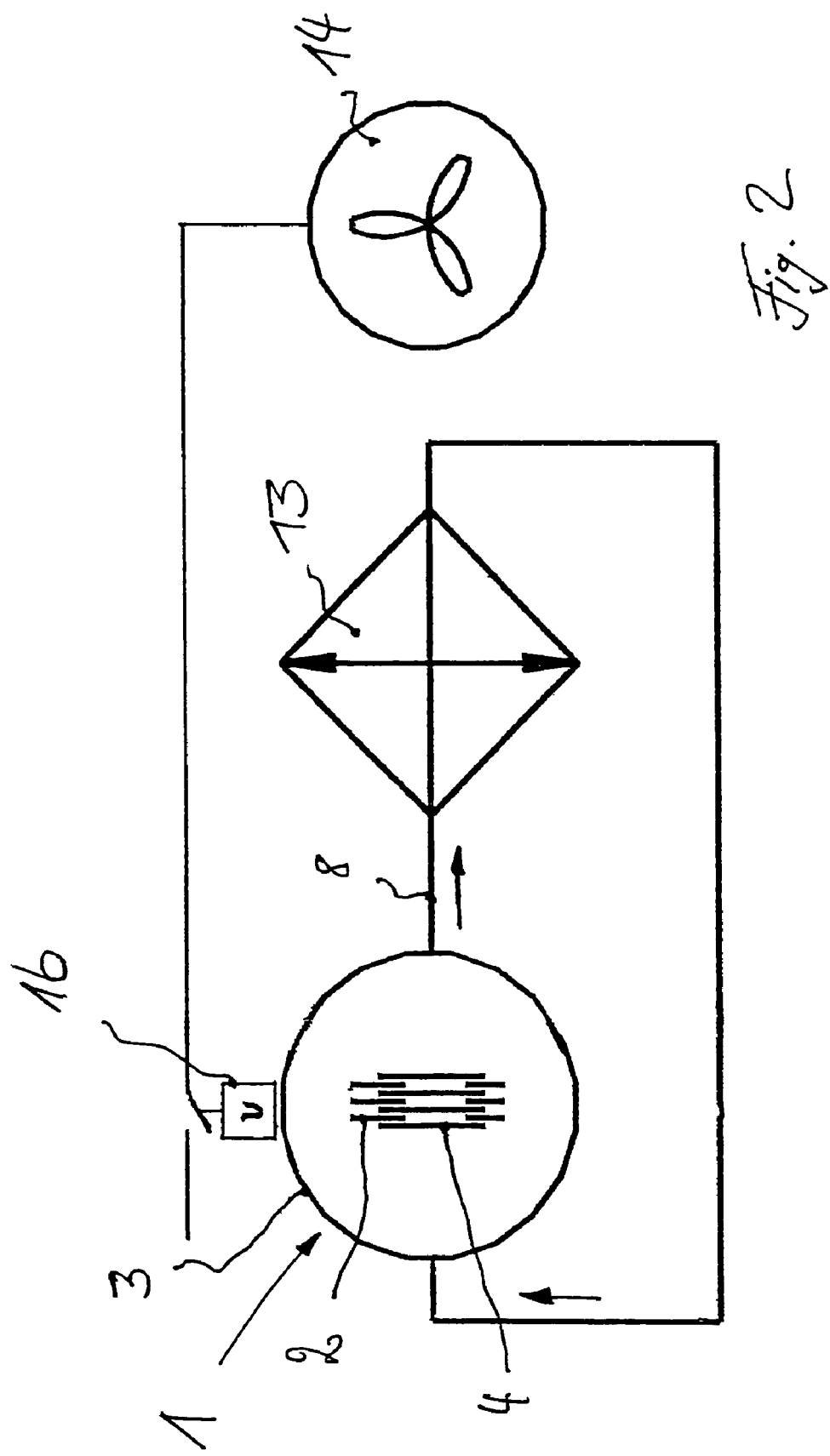
FIG. 2 is a schematic diagram of FIG. 1.

The cooling circuit 9 is provided with a cooling device 13, for example a radiator. The cooling device 13 also has a fan device 14. The fan device 14 can be temperature-controlled. For this purpose, as shown in FIG. 2, a temperature measurement device 16 is provided, such as a temperature switch, by means of which the temperature of the coolant or the temperature of the housing 3 or of the multiple-disk brake 1 can be measured.

During operation of the multiple-disk brake 1, i.e., when the disks 4 are rotating, the coolant is pumped from the smaller to the larger diameter disks 4 and travels through the coolant outlet 10 into the collecting device 11, from which it flows via the coolant line 8 to the radiator device 13. Cooled coolant flows via the line 8 and the coolant inlet 7 into the housing 3.

Figure 3:
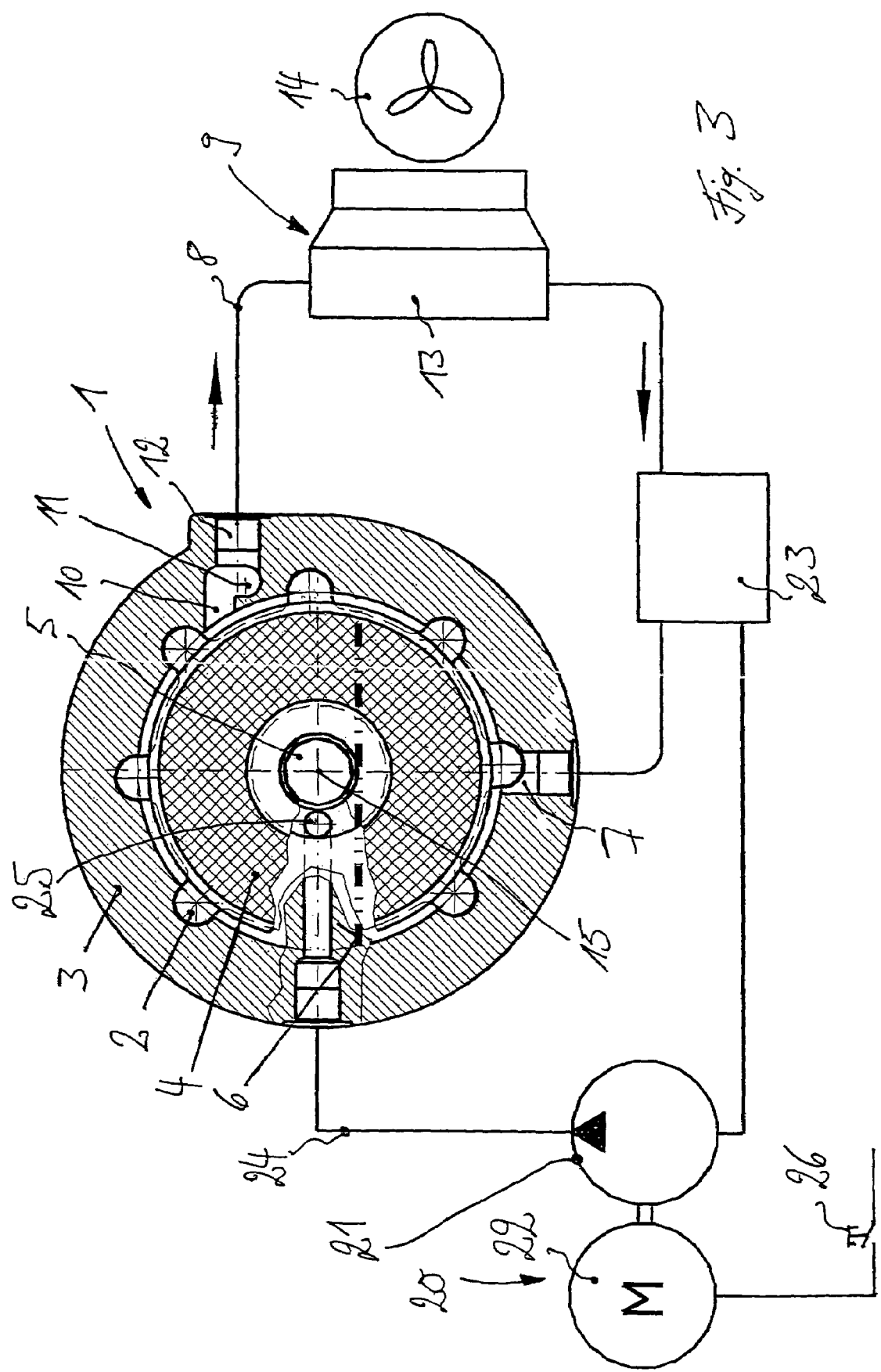
FIG. 3 is a cross section of another multiple-disk brake as taught by the invention.
Figure 4:
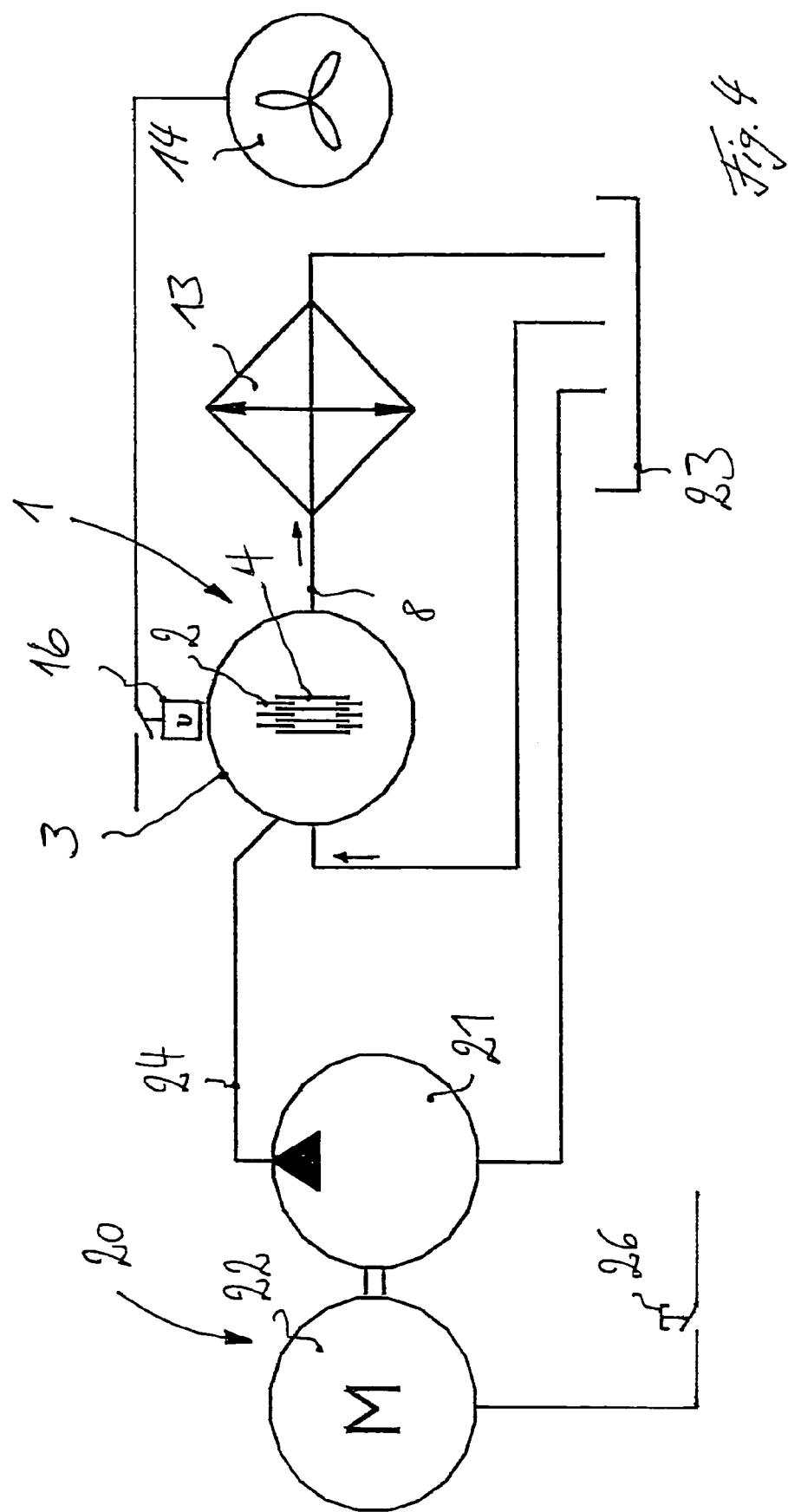
FIG. 4 is a schematic diagram of FIG. 3.

In the embodiment of the multiple-disk brake 1 of the invention illustrated in FIGS. 3 and 4, the multiple-disk brake 1 can be brought into communication with a coolant unit 20 in addition to the cooling circuit 9. The coolant unit 20 comprises a pump 21, for example a hydraulic pump, which is in a drive connection with a drive motor 22, such as an electric motor, for example. The pump 21 is in communication on the input side with a reservoir 23 and discharges into a line 24. The line 24 forms a coolant unit outlet 25 in the housing 3 in the radially inner area of the multiple-disk brake 1. The outlet 25 can be located on the end surfaces with respect to the disks 2, 4 and, for example, can be in the form of a mouth of a housing boring.

The coolant unit 20 can be turned on and off. For this purpose, an actuator device 26 is provided, for example a switch in the form of a brake pedal switch, which is effectively connected with the drive motor 22. When the multiple-disk brake 1 is used as a service brake, an additional supply of coolant to the outlet 25 and, thus, an improved cooling of the multiple-disk brake 1 can be achieved during operation of the brake 1 by turning on the coolant unit 20 as a function of the activation of the actuator device 26 (brake pedal switch) and, thus, as a function of a braking signal.

As a result of the use of the multiple-disk brake 1 taught by the invention as a pump to deliver the coolant to the radiator device 13, satisfactory cooling can be achieved when the housing 3 is only partly filled with coolant and without a separate pump. As a result, he amount of energy loss and heat dissipated by the multiple-disk brake 1 is low. In addition, a premature aging of the coolant is prevented. On account of the improved cooling and, optionally, the connection of the multiple-disk brake 1 to a coolant unit 20 that can be turned on and off, the multiple-disk brake 1 can continue to be used as a service brake. It thereby becomes possible to easily cool, among other things, a drive axle in which at least one drive motor and/or a transmission is located in addition to the multiple-disk brake 1.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A multiple-disk brake or clutch, comprising:
    at least one disk located in a housing;
    at least one disk located on a shaft, with coolant located in the housing;
    a coolant outlet and a coolant inlet of a cooling circuit provided on the housing, wherein coolant is delivered to the coolant outlet by means of the disks; and
    a coolant unit connected to the brake or clutch;
    wherein the coolant unit can be turned on or off, and
    wherein the coolant unit can be turned on as a function of a braking signal.

2. The multiple-disk brake or clutch as claimed in claim 1, wherein the housing is only partly filled with coolant.

3. The multiple-disk brake or clutch as claimed in claim 1, wherein when the shaft is oriented substantially horizontally, the coolant inlet is in the vicinity of a lowest point of the housing and the coolant outlet is on the housing in the area above a coolant level surface when the brake or clutch is not in operation.

4. The multiple-disk brake or clutch as claimed in claim 1, including a collecting device in the housing, which collecting device is in communication with the coolant outlet.

5. The multiple-disk brake or clutch as claimed in claim 4, wherein the collecting device is located underneath the coolant outlet in the housing when the shaft is oriented substantially horizontally.

6. The multiple-disk brake or clutch as claimed in claim 1, wherein the cooling circuit includes a cooling device.

7. The multiple-disk brake or clutch as claimed in claim 6, wherein the cooling device is a radiator.

8. The multiple-disk brake or clutch as claimed in claim 6, wherein the cooling device includes a fan device.

9. The multiple-disk brake or clutch as claimed in claim 8, wherein the fan device is temperature controlled as a function of a temperature of the coolant.

10. The multiple-disk brake or clutch as claimed in claim 1, wherein in the housing, in a radial inner area of the disks, a coolant unit outlet is provided for the coolant that is delivered by the coolant unit.

* * * * *